United States Patent
Lee et al.

(10) Patent No.: US 10,452,852 B2
(45) Date of Patent: Oct. 22, 2019

(54) METHOD AND APPARATUS FOR MEASUREMENT OF INFORMATION-SECURITY-CONTROLLING STATUS

(71) Applicant: Korea University Research and Business Foundation, Seoul (KR)

(72) Inventors: Kyung Ho Lee, Seoul (KR); Young In You, Seoul (KR); Seon Ju Kim, Seoul (KR); In Hyun Cho, Seoul (KR); Hyun Sik Yoon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 82 days.

(21) Appl. No.: 15/534,708

(22) PCT Filed: Aug. 24, 2015

(86) PCT No.: PCT/KR2015/008838
§ 371 (c)(1),
(2) Date: Jun. 9, 2017

(87) PCT Pub. No.: WO2016/093466
PCT Pub. Date: Jun. 16, 2016

(65) Prior Publication Data
US 2018/0357419 A1    Dec. 13, 2018

(30) Foreign Application Priority Data

Dec. 10, 2014   (KR) ........................ 10-2014-0177428

(51) Int. Cl.
*G06F 21/57*    (2013.01)

(52) U.S. Cl.
CPC ............ *G06F 21/577* (2013.01); *G06F 21/57* (2013.01); *G06F 2221/034* (2013.01)

(58) Field of Classification Search
CPC .................... G06F 2221/034; G06F 21/577
(Continued)

(56) References Cited

U.S. PATENT DOCUMENTS 8,874,685 B1 * 10/2014 Hollis .................... H04L 41/00
                                                       709/206
2009/0119141 A1 * 5/2009 McCalmont ....... G06Q 10/0637
                                                       705/7.41
(Continued)

FOREIGN PATENT DOCUMENTS

KR        20020064639 A      8/2002
KR        20050093196 A      9/2005
(Continued)

OTHER PUBLICATIONS

You et al., "Advanced Security Assessment for Control effectiveness," In: WISA 2014, The 15th International Workshop on Information Security Applications, Edited by Kyung-Hyune Rhee et al., Springer International Publication (Aug. 27, 2014), 14 pages.

*Primary Examiner* — Michael Pyzocha
*Assistant Examiner* — Zoha Piyadehghibi Tafaghodi
(74) *Attorney, Agent, or Firm* — Fox Rothschild LLP

(57) ABSTRACT

A method for measurement of an information-security-controlling status in accordance with the present disclosure includes receiving actual inspection data obtained by actually inspecting whether each domain complies with each security-controlling item, computing security-controlling status measurement scores for each domain on the basis of a significance grade of each control item, the degree of compliance with a corresponding control item, and a weighting set by a measurement manager, computing a final security-controlling status measurement score for a parent organization to which each domain belongs on the basis of an average of the security-controlling status measurement scores for each domain, and outputting the computed secu- (Continued)

rity-controlling status measurement scores and final security-controlling status measurement score.

8 Claims, 3 Drawing Sheets

(58) Field of Classification Search
USPC .......................................................... 726/25
See application file for complete search history.

(56) References Cited

U.S. PATENT DOCUMENTS

2014/0218389 A1* 8/2014 Bennett ................. G06F 21/577
345/593
2014/0380488 A1* 12/2014 Datta Ray ........... H04L 63/1433
726/25

FOREIGN PATENT DOCUMENTS

| KR | 101025422 B1 | 3/2011 |
| KR | 101166568 B1 | 7/2012 |
| KR | 20140081071 A | 7/2014 |

\* cited by examiner

FIG. 3

| ORGANIZATION | DOMAIN NUMBER | DETAIL CODE | SIGNIFICANCE GRADE | CONTROL |
|---|---|---|---|---|
| ΔΔ ORGANIZATION | A | A.XX | SR | Yes |
| | | A.XX | M | Yes |
| | | A.XX | SR | N/A |
| | | A.XX | M | Yes |
| | | A.XX | R | Partial |
| | B | B.XX | M | Partial |
| | | B.XX | M | Yes |
| | | B.XX | M | Yes |
| | | B.XX | SR | Partial |
| | C | C.XX | SR | Yes |
| | | C.XX | SR | Yes |
| | | C.XX | M | Yes |
| | | C.XX | M | Yes |
| | D | D.XX | M | Yes |
| | | D.XX | M | Yes |
| | | D.XX | M | Yes |
| | | D.XX | R | N/A |

| DOMAIN NUMBER | CATEGORY | SCORE | BASIS OF COMPUTATION |
|---|---|---|---|
| A | M | 1 | YES FOR ALL TWO (1 POINT) |
| | SR | 1 | YES FOR ONE RESPONSE ITEM (EXCEPT N/A) (1 POINT) |
| | R | 0.5 | PARTIAL FOR ONE |
| B | M | 0 | PARTIAL EXISTS FOR RESPONSE ITEM (0 POINT) |
| | SR | 0.5 | PARTIAL FOR ONE |
| C | M | 1 | YES FOR ALL TWO (1 POINT) |
| | SR | 1 | YES FOR ALL TWO (1 POINT) |
| D | M | 1 | YES FOR ALL THREE (1 POINT) |

METHOD AND APPARATUS FOR MEASUREMENT OF INFORMATION-SECURITY-CONTROLLING STATUS

CROSS REFERENCE TO RELATED APPLICATIONS

This application is a U.S. National Phase of International Patent Application No. PCT/KR2015/008838, filed Aug. 24, 2015, which claims priority to Korean Application No. 10-2014-0177428, filed Dec. 10, 2014, the disclosures of which are incorporated herein by reference.

TECHNICAL FIELD

The present disclosure relates to a method and an apparatus for measurement of an information-security-controlling status.

BACKGROUND

Due to the rapid growth of the Internet and IT environment, various industry environments have undergone rapid change caused by informatization. Accordingly, as an adverse effect thereof, problems such as information leakage have occurred. Also, the advent of new hacking techniques and viruses, security risks caused by insiders, physical security risks, and the like are on the increase.

Conventional risk measurement systems are vulnerability analysis and evaluation systems configured to check known vulnerabilities inherent on the network or information system and compute the degree of vulnerability of the network or system, but cannot analyze all of threats and vulnerabilities relevant to information security to compute an information security risk index.

Meanwhile, in general, each person has a different standard for evaluation of value. Particularly, due to organic correlation of information, it is difficult to simply measure a present value of single information. Therefore, it is necessary to evaluate the value of information in an integrated manner and appropriately control information security based on the result of evaluation.

In this regard, Korean Patent Laid-open Publication No. 10-2002-0064639 (entitled "Information risk analysis method using integrated approach of case based reasoning and structured analysis methodology") suggests of a method of rapidly analyzing an information security risk by automatically providing the result of risk analysis evaluation of a new organization using the previous most similar risk analysis case.

However, this is an analysis method using attribute information of a specific organization, but cannot produce a risk index by computing the degree of information security risk of each organization and industry field in a broad range such as a country.

That is, in order to compute an information security risk index in a broad range, similar organization analysis experience and knowledge of the past on the basis of a specific organization are reused without consideration of information technology environments of organizations by industry and size and between organizations.

DISCLOSURE OF THE INVENTION

Problems to be Solved by the Invention

The present disclosure provides a method and an apparatus for measurement of an information-security-controlling status in an information security management system.

Means for Solving the Problems

As a technical means for solving the above-described problem, a method for measurement of an information-security-controlling status in accordance with an exemplary embodiment of the present disclosure includes receiving actual inspection data obtained by actually inspecting whether each domain complies with each security-controlling item, computing security-controlling status measurement scores for each domain on the basis of a significance grade of each control item, the degree of compliance with a corresponding control item, and a weighting set by a measurement manager, computing a final security-controlling status measurement score for a parent organization to which each domain belongs on the basis of an average of the security-controlling status measurement scores for each domain, and outputting the computed security-controlling status measurement scores and final security-controlling status measurement score.

Further, an information-security-controlling status measurement apparatus in accordance with a second exemplary embodiment of the present disclosure includes a data transmitting/receiving unit, a memory in which an information-security-controlling status measurement application is stored, and a processor that executes the application. Herein, upon execution of the application, the processor receives actual inspection data obtained by actually inspecting whether each domain complies with each security-controlling item, computes security-controlling status measurement scores for each domain on the basis of a significance grade of each control item, the degree of compliance with a corresponding control item, and a weighting set by a measurement manager, computes a final security-controlling status measurement score for a parent organization to which each domain belongs on the basis of an average of the security-controlling status measurement scores for each domain, and outputs the computed security-controlling status measurement scores and final security-controlling status measurement score.

Effects of the Invention

According to the above-described technical means for solving the problem, the information-security-controlling status measurement apparatus can analyze vulnerabilities of information security and threats incurred when information security is not controlled and thus compute an information security risk index. Therefore, it is possible to provide a countermeasure against an information security risk.

Further, it is possible to identify a mandatory implementation item considering characteristics of an organization and also possible to set an appropriate weighting to information in need of security as needed by a measurement manager. Thus, it is possible to more efficiently measure an information-security-controlling status.

BRIEF DESCRIPTION OF THE DRAWINGS

FIG. 3 is an exemplary diagram illustrating the computation of a security-controlling status measurement score in accordance with an exemplary embodiment of the present disclosure.

BEST MODE FOR CARRYING OUT THE INVENTION

Figure 1:
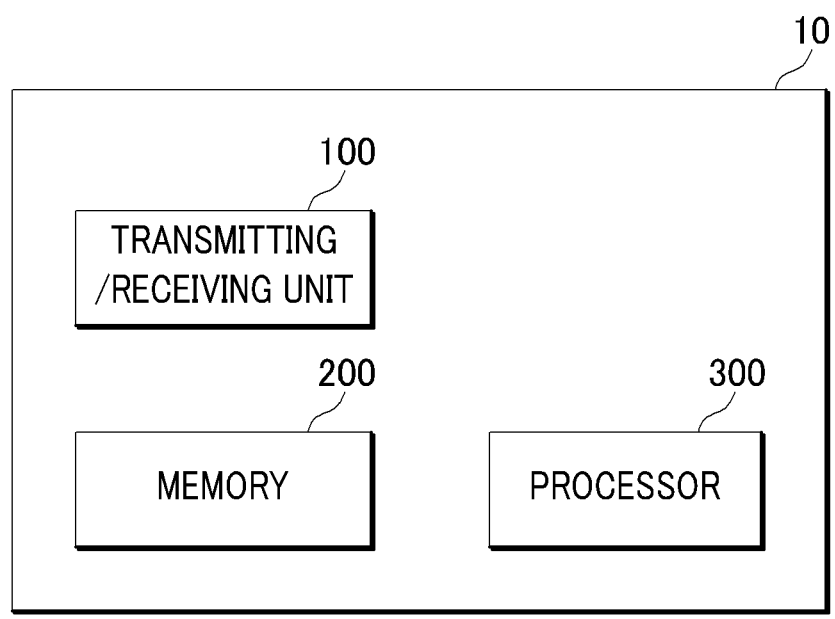
FIG. 1 is a block diagram illustrating an information-security-controlling status measurement apparatus in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "step of" does not mean "step for".

Hereinafter, a method and an apparatus for measurement of an information-security-controlling status in accordance with an exemplary embodiment of the present disclosure will be described in detail with reference to the accompanying drawings.

FIG. 1 is a block diagram illustrating an information-security-controlling status measurement apparatus in accordance with an exemplary embodiment of the present disclosure.

Referring to FIG. 1, an information-security-controlling status measurement apparatus 10 includes a data transmitting/receiving unit 100, a memory 200 in which an information-security-controlling status measurement application is stored, and a processor 300 that executes the application.

The data transmitting/receiving unit 100 receives actual inspection data from each measurement manager (i.e., measurement manager's user device or the like). Further, when a final measurement score of the received data is output, the data transmitting/receiving unit 100 may transmit the final measurement score to each measurement manager.

The memory 200 stores an application configured to provide the measurement of an information-security-controlling status. Herein, the memory 200 collectively refers to a volatile storage device and a non-volatile storage device that retains information stored therein even when power is not supplied. For example, the memory 200 may include NAND flash memories such as a compact flash (CF) card, a secure digital (SD) card, a memory stick, a solid-state drive (SSD), and a micro SD card, magnetic computer storage devices such as a hard disk drive (HDD), and optical disk drives such as CD-ROM and DVD-ROM.

Further, the application stored in the memory 200 and configured to provide the measurement of an information-security-controlling status may be implemented as software or hardware such as a field programmable gate array (FPGA) or an application specific integrated circuit (ASIC), and may carry out predetermined functions.

Meanwhile, the processor 300 executes the application stored in the memory 200 and configured to provide the measurement of an information-security-controlling status.

A method for measurement of an information-security-controlling status will be described in detail with reference to FIG. 2.

Figure 2:
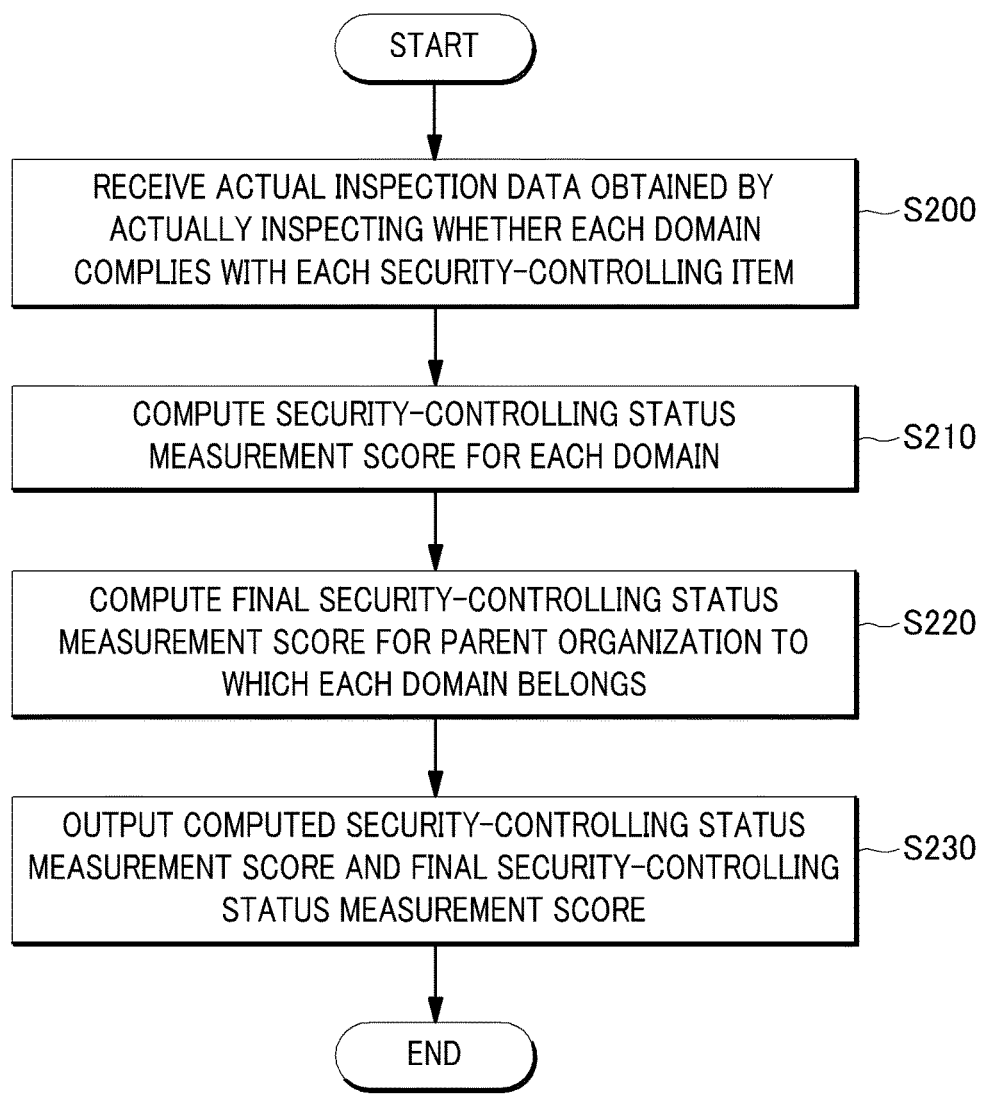
FIG. 2 is a flowchart provided to explain a method for measurement of an information-security-controlling status in accordance with an exemplary embodiment of the present disclosure.

FIG. 2 is a flowchart provided to explain a method for measurement of an information-security-controlling status in accordance with an exemplary embodiment of the present disclosure.

Firstly, when an information-security-controlling status measurement application is executed, the information-security-controlling status measurement apparatus 10 receives actual inspection data obtained by actually inspecting whether each domain complies with each security-controlling item (S200).

Then, the information-security-controlling status measurement apparatus 10 computes security-controlling status measurement scores for each domain on the basis of a significance grade of each control item, the degree of compliance with a corresponding control item, and a weighting set by a measurement manager (S210).

Then, the information-security-controlling status measurement apparatus 10 computes a final security-controlling status measurement score for a parent organization to which each domain belongs on the basis of an average of the security-controlling status measurement scores for each domain (S220).

Then, the information-security-controlling status measurement apparatus 10 outputs the computed security-controlling status measurement scores and final security-controlling status measurement score (S230).

More specifically, when the processor 300 is driven, the information-security-controlling status measurement apparatus 10 receives actual inspection data obtained by actually inspecting whether each domain complies with each security-controlling item (S200).

Herein, the actual inspection data may include an item of information in need of security control in a corresponding organization, a significance grade of the security-controlling item, and compliance or non-compliance of the security-controlling item with security control.

Herein, the significance grade of the security-controlling item may be classified into Mandatory (M), Strongly Recommended (SR), and Recommended (R). Further, the compliance or non-compliance of the security-controlling item with security control may be classified into Compliance (Yes), Non-compliance (No), Partial compliance (Partial), and Not Applicable (N/A).

For example, a requirement in the law, enforced ordinance, and announcement regarding an organization or information relevant to a mandatory action involved in the existence of the organization may be classified as Mandatory (M).

Further, advice which is not required on the basis of the law but recommended in a guide, a manual, or a guidebook or information with high effectiveness and efficiency at the moment when security is controlled may be classified as Strongly Recommended (SR).

Furthermore, information with effectiveness and efficiency in security control at the moment may be classified as Recommended (R).

Meanwhile, domains may be randomly divided by the measurement manager depending on a security-controlling item and characteristics of an organization to be measured, and the number of domains is not limited. Further, a domain may include at least one information required for security. For example, the domain may be defined as a child organization, and a parent organization may include multiple child organizations. That is, the parent organization may be classified into multiple domains representing child organizations.

That is, the measurement manager may a classify security item of each information by domain. Further, the measurement manager may classify a security item by significance grade and may actually inspect whether the corresponding security item is controlled and then transmit actual inspection data to the information-security-controlling status measurement apparatus 10.

Then, the information-security-controlling status measurement apparatus 10 computes security-controlling status measurement scores for each domain on the basis of a significance grade of each control item, the degree of compliance with a corresponding control item, and a weighting set by a measurement manager, which are received in S200 (S210).

Herein, the processor 300 may primarily compute security measurement scores for each domain of which each security-controlling item is classified by a given significance. In this case, a score of each significance grade may be computed independently, and the computation may be performed with reference to the following equation.

$$Di = M*SR*R \quad \text{[Equation 1]}$$

Herein, i represents a domain number, * represents an operator, D represents a domain, M represents an average value of compliance scores of Mandatory, SR represents an average value of compliance scores of Strongly Recommended, and R represents an average value of compliance scores of Recommended.

A score of each significance grade as computed according to the above equation may become a criterion to identify a domain of an organization in need of prior action.

Meanwhile, the average values of compliance scores of the significance grades may be calculated according to the following Equation 2 to Equation 4, respectively. An average value of compliance scores of each significance grade may be calculated by adding up compliance scores in the corresponding domain and dividing the sum of the compliance scores by the number of items of the corresponding grade.

$$M = \frac{\text{The sum of compliance scores of Mandatory items}}{\text{Total number of Mandatory items}} \quad \text{[Equation 2]}$$

(If there is at least one "No" or "partial" for Mandatory items, $M = 0$)

$$SR = \frac{\text{The sum of compliance scores of Strongly Recommended items}}{\text{Total number of Strongly Recommended items}} \quad \text{[Equation 3]}$$

$$R = \frac{\text{The sum of compliance scores of Recommended items}}{\text{Total number of Recommended items}} \quad \text{[Equation 4]}$$

Herein, M represents an average value of compliance scores of Mandatory, SR represents an average value of compliance scores of Strongly Recommended, and R represents an average value of compliance scores of Recommended.

Meanwhile, as for an item belonging to Mandatory, if there is at least one Non-compliance or Partial-compliance, a score of "0" is given regardless of compliance with another item. This is because Mandatory is information involved in the existence of an organization, and, thus, at least one Partial-compliance or Non-compliance can incur a fatal risk to the organization.

Further, the information-security-controlling status measurement apparatus 10 may calculate an average value of compliance scores of each significance grade in each control item. The calculated average value may be computed on the basis of a weighting set for each significance grade in each control item. Herein, the weighting may be set by the measurement manager and may include a first value, a second value, and a third value. A security-controlling status measurement score for each domain may be computed by multiplying the sum of the first value, the product of an average value of compliance scores of Strongly Recommended (SR) and the second value, and the product of an average value of compliance scores of Recommended (R) and the third value by an average value of compliance scores of Mandatory (M).

Hereinafter, a more detailed example will be described. As described above, the processor 300 computes an average value of compliance scores of each significance grade. For example, the processor 300 may set Compliance to "1", Partial compliance to "0.5", and Non-compliance to "0", and Not applicable to "corresponding item excluded". If the number of Strongly Recommended grades corresponding to a specific domain is 2 and the number of complied items of Strongly Recommended is 2, a score of 1 may be given to Strongly Recommended. Also, if the number of Strongly Recommended grades corresponding to a specific domain is 2 and the number of complied items of Strongly Recommended is 1, a score of 0.5 may be given to Strongly Recommended. If the number of Strongly Recommended grades corresponding to a specific domain is 2 and the number of partially complied items of Strongly Recommended is 1, a score of 0.25 may be given to Strongly Recommended.

Then, a security-controlling status measurement score computed for each domain may be calculated according to the following equation.

$$Di = M \times (a + b \times SR + c \times R) \quad \text{[Equation 5]}$$

Herein, i represents a domain number, D represents a domain, M represents an average value of compliance scores of Mandatory, SR represents an average value of compliance scores of Strongly Recommended, R represents an average value of compliance scores of Recommended, a represents a first value, b represents a second value, and c represents a third value. In this case, the sum of the first to third values is 1.

The method of computing a security-controlling status measurement score will be described below in more detail with reference to FIG. 3.

Then, the information-security-controlling status measurement apparatus 10 computes a final security-controlling status measurement score for a parent organization to which each domain belongs on the basis of an average of the security-controlling status measurement scores for each domain, which is computed in S210 (S220).

In this case, the final measurement score may refer to an average of security-controlling status measurement scores for each domain. That is, the final measurement score can be computed by dividing the sum of security-controlling status measurement scores for all domains by the number of the domains.

Then, the information-security-controlling status measurement apparatus 10 outputs the computed security-controlling status measurement scores and final security-controlling status measurement score, which are computed in S220 (S230).

Meanwhile, the method of computing a security-controlling status measurement score will be described in detail with reference to FIG. 3.

FIG. 3 is an exemplary diagram illustrating the computation of a security-controlling status measurement score in accordance with an exemplary embodiment of the present disclosure.

Referring to FIG. 3, security information of an ΔΔ organization may be classified into four domains A, B, C, and D or may be set in a different manner. Further, herein, a detail code corresponds to each security information. As for a domain A, significance grades include two Mandatory (M) grades and it is confirmed that control of the corresponding item is implemented (Yes). Referring to the basis of computation in a lower column, security control of all of two Mandatory (M) items is confirmed, and, thus, a security-controlling status measurement score may be computed at 1.

Further, as for the domain A, the significance grades include two Strongly Recommended (SR) grades and it is confirmed that control of one of them is "Not applicable (NA)" and control of the other is implemented (Yes). Therefore, as a result of compliance with one response item except "N/A", a security-controlling status measurement score may be computed at 1.

Meanwhile, as for a domain B, significance grades include three Mandatory (M) grades, and one item of them is partially complied (Partial), and, thus, a security-controlling status measurement score may be computed at 0 regardless of compliance or non-compliance of the other items.

Further, as for the domain B, the significance grades include one Strongly Recommended (SR) grade and it is confirmed that control is partially implemented (Partial). Therefore, a security-controlling status measurement score may be computed at 0.5.

A score computed as such and corresponding to each significance grade may be substituted in Equation 3 to calculate a security-controlling status measurement score computed for each domain. In this case, a weighting may be set by the measurement manager and the sum of the first to third values corresponding to the weighting is 1. Further, a single score may be computed on the basis of the computed score. For example, a final total security-controlling status measurement score for the organization being measured may be computed.

Meanwhile, the information-security-controlling status measurement apparatus 10 may be implemented in an executable program command form by various computer means and be recorded in a computer-readable storage medium. Herein, the computer-readable storage medium may include a program command, a data file, and a data structure individually or a combination thereof. Meanwhile, the program command recorded in the storage medium may be specially designed or configured for the present disclosure or may be known to those skilled in a computer software field to be used.

The computer-readable storage medium may include magnetic media such as hard disk, floppy disk, or magnetic tape, optical media such as CD-ROM or DVD, magneto-optical media such as floptical disk, and a hardware device such as ROM, RAM, flash memory specially configured to store and execute program commands.

Meanwhile, the storage medium can be a program command and a light including a carrier wave that sends a signal specifying a data structure, or can be a transmission medium such as a metal line and waveguide. Examples of the program command include a machine language code created by a complier and a high-level language code executable by a computer using an interpreter. The hardware device may be configured to be operated as at least one software module to perform an operation of the present disclosure, and vice versa.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for measurement of an information-security-controlling status of a parent organization, comprising:
    receiving actual inspection data obtained by actually inspecting from each measurement manager's terminal whether each domain belongs to the parent organization complies with each security-controlling item;
    computing security-controlling status measurement scores for each domain on the basis of a significance grade of each control item, the degree of compliance with a corresponding control item, and a weighting set by the measurement manager;
    computing a final security-controlling status measurement score for the parent organization to which each domain belongs on the basis of an average of the security-controlling status measurement scores for each domain; and
    outputting the computed security-controlling status measurement scores and final security-controlling status measurement score;
    wherein the significance grade of the security-controlling item is classified into Mandatory (M), Strongly Recommended (SR), and Recommended (R); and
    wherein the computing of final security-controlling status measurement scores for each domain includes:
        calculating an average value of compliance scores of the significance grade of each control item; and
        computing the final security-controlling status measurement score by multiplying the sum of a first weighting value, the product of an average value of compliance scores of Strongly Recommended(SR) and a second weighting value, and the product of an average value of compliance scores of Recommended(R) and a third weighting value by an average value of compliance scores of Mandatory(M).

2. The method for measurement of an information-security-controlling status of claim 1,
wherein the actual inspection data includes
the security-controlling item,
a significance grade of the security-controlling item, and
compliance or non-compliance of the security-controlling item with security control.

3. The method for measurement of an information-security-controlling status of claim 2,
wherein the compliance or non-compliance of the security-controlling item with security control is classified into Compliance (Yes), Non-compliance (No), Partial compliance (Partial), and Not Applicable (N/A).

4. The method for measurement of an information-security-controlling status of claim 3,
wherein the sum of the first to third values is 1.

5. The method for measurement of an information-security-controlling status of claim 1,
wherein the computing of a final security-controlling status measurement score includes: calculating an average value of the security-controlling status measurement scores for each domain.

6. A non-transitory computer-readable storage medium that stores a program configured to execute a method for measurement of an information-security-controlling status of a parent organization, the method comprising:
receiving actual inspection data obtained by actually inspecting from each measurement manager's terminal whether each domain belongs to the parent organization complies with each security-controlling item;
computing security-controlling status measurement scores for each domain on the basis of a significance grade of each control item, the degree of compliance with a corresponding control item, and a weighting set by the measurement manager;
computing a final security-controlling status measurement score for the parent organization to which each domain belongs on the basis of an average of the security-controlling status measurement scores for each domain; and
outputting the computed security-controlling status measurement scores and final security-controlling status measurement score;
wherein the significance grade of the security-controlling item is classified into Mandatory (M), Strongly Recommended (SR), and Recommended (R); and
wherein the computing of security-controlling status measurement scores for each domain includes:
calculating an average value of compliance scores of the significance grade of each control item; and
computing the security-controlling status measurement score by multiplying the sum of a first weighting value, the product of an average value of compliance scores of Strongly Recommended(SR) and a second weighting value, and the product of an average value of compliance scores of Recommended(R) and a third weighting value by an average value of compliance scores of Mandatory(M).

7. An apparatus for measurement of an information-security-controlling status of a parent organization, comprising:
a data transmitting/receiving unit;
a memory in which an information-security-controlling status measurement application is stored; and
a processor that executes the application;
wherein upon execution of the application, the processor receives actual inspection data obtained by actually inspecting from each measurement manager's terminal whether each domain belongs to the parent organization complies with each security-controlling item,
computes security-controlling status measurement scores for each domain on the basis of a significance grade of each control item, the degree of compliance with a corresponding control item, and a weighting set by the measurement manager,
computes a final security-controlling status measurement score for a parent organization to which each domain belongs on the basis of an average of the security-controlling status measurement scores for each domain, and
outputs the computed security-controlling status measurement scores and final security-controlling status measurement score:
wherein the significance grade of the security-controlling item is classified into Mandatory (M), Strongly Recommended (SR), and Recommended (R); and
wherein the processor
calculates an average value of compliance scores of the significance grade of each control item, and
computes the final security-controlling status measurement score by multiplying the sum of a first weighting value, the product of an average value of compliance scores of Strongly Recommended(SR) and a second weighting value, and the product of an average value of compliance scores of Recommended(R) and a third weighting value by an average value of compliance scores of Mandatory(M).

8. The information-security-controlling status measurement apparatus of claim 7,
wherein the actual inspection data includes
the security-controlling item,
a significance grade of the security-controlling item, and
compliance or non-compliance of the security-controlling item with security control.

* * * * *